United States Patent
Tsujita et al.

(10) Patent No.: US 8,837,874 B2
(45) Date of Patent: Sep. 16, 2014

(54) OPTO-ELECTRIC HYBRID BOARD AND METHOD OF MANUFACTURING SAME

(71) Applicant: Nitto Denko Corporation, Ibaraki (JP)

(72) Inventors: Yuichi Tsujita, Ibaraki (JP); Yasuto Ishimaru, Ibaraki (JP); Hiroyuki Hanazono, Ibaraki (JP); Naoyuki Tanaka, Ibaraki (JP); Yasufumi Yamamoto, Ibaraki (JP); Shotaro Masuda, Ibaraki (JP); Mayu Ozaki, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 14 days.

(21) Appl. No.: 13/866,273

(22) Filed: Apr. 19, 2013

(65) Prior Publication Data

US 2013/0301980 A1 Nov. 14, 2013

(30) Foreign Application Priority Data

May 8, 2012 (JP) ................................. 2012-106834

(51) Int. Cl.
*G02B 6/12* (2006.01)
*G02B 6/43* (2006.01)
*G02B 6/122* (2006.01)
*G02B 6/136* (2006.01)
*G02B 6/138* (2006.01)

(52) U.S. Cl.
CPC ... *G02B 6/122* (2013.01); *G02B 6/43* (2013.01); *G02B 6/136* (2013.01); *G02B 6/138* (2013.01)
USPC .......................................................... 385/14

(58) Field of Classification Search
USPC .......................................................... 385/14
See application file for complete search history.

(56) References Cited

U.S. PATENT DOCUMENTS

| 6,184,478 B1 | 2/2001 | Imano et al. |
| 6,477,284 B1 | 11/2002 | Oda et al. |
| 2003/0053765 A1 | 3/2003 | Oda et al. |
| 2009/0269704 A1* | 10/2009 | Hodono ........................ 430/319 |

FOREIGN PATENT DOCUMENTS

| JP | 2001-007463 A | 1/2001 |
| JP | 2009-265342 A | 11/2009 |
| JP | 2010-164655 A | 7/2010 |

OTHER PUBLICATIONS

European Search Report dated Jul. 25, 2013, issued in European Patent Application No. 13164863.6.

* cited by examiner

*Primary Examiner* — Uyen Chau N Le
*Assistant Examiner* — Hoang Tran
(74) *Attorney, Agent, or Firm* — Westerman, Hattori, Daniels & Adrian, LLP

(57) ABSTRACT

An opto-electric hybrid board capable of suppressing the increase in light propagation losses and excellent in flexibility, and a method of manufacturing the same, are provided. The opto-electric hybrid board includes an electric circuit board, an optical waveguide, and a metal layer. The electric circuit board includes an insulative layer having front and back surfaces, and electrical interconnect lines formed on the front surface of the insulative layer. The optical waveguide is formed on the back surface of the insulative layer. The metal layer is formed between the cladding layer and the insulative layer. At least part of the metal layer is formed in one of first and second patterns. The first pattern includes a distribution of dot-shaped protrusions, and the second pattern includes a distribution of dot-shaped recesses. A first cladding layer fills a site where the metal layer is removed by the patterning.

6 Claims, 8 Drawing Sheets

RELATED ART

OPTO-ELECTRIC HYBRID BOARD AND METHOD OF MANUFACTURING SAME

BACKGROUND OF THE INVENTION

1. Field of the Invention

The present invention relates to an opto-electric hybrid board including an optical waveguide and an electric circuit board which are stacked together, and a method of manufacturing the same.

2. Description of the Related Art

With the increase in the amount of transmission information, optical interconnection in addition to electrical interconnection has been used in recent electronic devices and the like. As an example of such a technique, an opto-electric hybrid board has been disclosed in Japanese Laid-open Patent Application Publication No. 2010-164655. As shown in FIG. 11, this opto-electric hybrid board includes: an electric circuit board $E_0$ including an insulative substrate 51 made of polyimide and the like, and electrical interconnect lines 52 formed on the front surface of the insulative substrate 51; and an optical waveguide (optical interconnect lines) $W_0$ (including an under cladding layer 56, cores 57 and an over cladding layer 58) made of epoxy resin and the like and stacked on the back surface (a surface opposite from the surface with the electrical interconnect lines 52 formed thereon) of the insulative substrate 51.

In the aforementioned opto-electric hybrid board, however, the insulative substrate 51 (polyimide resin and the like) and the optical waveguide $W_0$ (epoxy resin and the like) are in contact with each other. A difference in coefficient of linear expansion between the insulative substrate 51 and the optical waveguide $W_0$ causes stresses and slight bending in the optical waveguide $W_0$ at ambient temperature, resulting in increased light propagation losses in the optical waveguide $W_0$.

Another opto-electric hybrid board, on the other hand, has been disclosed in Japanese Laid-open Patent Application Publication No. 2009-265342. As shown in FIG. 12, this opto-electric hybrid board includes a stainless steel layer $M_0$ provided entirely between the insulative substrate 51 and the optical waveguide $W_0$. In this opto-electric hybrid board, the stainless steel layer $M_0$ serves as a reinforcement to prevent stresses and slight, bending in the optical waveguide $W_0$, thereby suppressing the increase in light propagation losses.

The opto-electric hybrid board is required to suppress the increase in light propagation losses, as stated above. In addition to this, the opto-electric hybrid board is required to have flexibility in some cases. However, the stainless steel layer $M_0$ acts as an impediment to flexibility when provided entirely as mentioned above (with reference to FIG. 12) for the purpose of decreasing the light propagation losses.

SUMMARY OF THE INVENTION

In view of the foregoing, an opto-electric hybrid board which is capable of suppressing the increase in light propagation losses and which is excellent in flexibility, and a method of manufacturing the same are provided.

The opto-electric hybrid board comprises: an electric circuit board including an insulative layer having front and back surfaces, and electrical interconnect lines formed on the front surface of the insulative layer; an optical waveguide including a cladding layer, the optical waveguide being formed on the back surface of the insulative layer of the electric circuit board; and a metal layer formed between the cladding layer of the optical waveguide and the insulative layer of the electric circuit board, at least part of the metal layer being formed in one of first and second patterns, the first pattern including a distribution of dot-shaped protrusions, the second pattern including a distribution of dot-shaped recesses, the cladding layer of the optical waveguide filling a site where the metal layer is removed by the patterning.

The method of manufacturing an opto-electric hybrid board comprises the steps of: forming an insulative layer on a first surface of a metal layer; forming electrical interconnect lines on a surface of the insulative layer; forming an optical waveguide on a second surface of the metal layer, at least part of the metal layer is etched to form one of first and second patterns prior to the forming of the optical waveguide, the first pattern including a distribution of dot-shaped protrusions, the second pattern including a distribution of dot-shaped recesses.

In the opto-electric hybrid board, at least part of the metal layer is formed in one of the first and second patterns. In other words, the metal layer is formed partially, rather than entirely. Thus, the opto-electric hybrid board is rich in flexibility. This allows the use of the opto-electric hybrid board which is bendable, thereby providing a higher degree of freedom in the use of the opto-electric hybrid board. If the opto-electric hybrid board is impacted, the opto-electric hybrid board is easily deformed to lessen the impact. The part of the metal layer which is patterned as mentioned above serves as a reinforcement. This prevents stresses and slight bending in cores of the optical waveguide, to suppress the increase in the hg propagation losses in the optical waveguide. The site where the metal layer is removed by the patterning is not hollow but is filled with the cladding layer of the optical waveguide. This stabilizes the shape of the cores of the optical waveguide to maintain proper light propagation. In this manner, the opto-electric hybrid board is excellent in flexibility, and is also excellent in suppressing the increase in light propagation losses.

Preferably, part of the opto-electric hybrid board is formed as a to-be-bent portion, and parts of the metal layer corresponding to the to-be-bent portion and an outer portion outside the to-be-bent portion have one of first and second configurations, the first configuration being such that the size of the dot-shaped protrusions in the outer portion decreases gradually toward the to-be-bent portion and such that the dot-shaped protrusions of the smallest size are distributed in the to-be-bent portion, the second configuration being such that the size of the dot-shaped recesses in the outer portion increases gradually toward the to-be-bent portion and such that the dot-shaped recesses of the largest size are distributed in the to-be-bent portion. In such a case, the density of the metal layer decreases gradually toward the to-be-bent portion, and is lowest in the to-be-bent portion. Thus, the to-be-bent portion, in which the part of the metal layer which hinders bending is small in area, is excellent in bendability. If the to-be-bent portion is bent repeatedly, a break occurs in few parts of the metal layer in the to-be-bent portion. Accordingly, no breaks occur in the cores of the optical waveguide. Thus, the opto-electric hybrid board is excellent in resistance to repeated bending.

Preferably, part of the opto-electric hybrid board is formed as a to-be-bent portion, and parts of the metal layer corresponding to the to-be-bent portion and an outer portion outside the to-be-bent portion have one of first and second configurations, the first configuration being such that the size of the dot-shaped protrusions in the outer portion decreases gradually toward the to-be-bent portion and such that the metal layer is removed in the to-be-bent portion, the second configuration being such that the size of the dot-shaped recesses in the outer portion increases gradually toward the to-be-bent portion and such that the metal layer is removed in the to-be-bent portion. In such a case, the density of the metal layer decreases gradually toward the to-be-bent portion, and the metal layer is absent in the to-be-bent portion. Thus, the to-be-bent portion, in which there are no parts of the metal layer which hinder bending, is more excellent in bendability. If the to-be-bent portion is bent repeatedly, there are no parts of the metal layer in which a break occurs. Accordingly, no breaks occur in the cores of the optical waveguide. Thus, the opto-electric hybrid board is more excellent in resistance to repeated bending.

In the method of manufacturing the opto-electric hybrid board, the metal layer of the opto-electric hybrid board is etched to form one of the first and second patterns, before the optical waveguide is formed. Thus, the opto-electric hybrid board excellent in flexibility and also excellent in suppressing the increase in light propagation losses as mentioned above is easily provided.

Preferably, part of the opto-electric hybrid board is formed as a to-be-bent portion, and parts of the metal layer corresponding to the to-be-bent portion and an outer portion outside the to-be-bent portion are formed in one of first and second configurations by the etching, the first configuration being such that the size of the dot-shaped protrusions in the outer portion decreases gradually toward the to-be-bent portion and such that the dot-shaped protrusions of the smallest size are distributed in the to-be-bent portion, the second configuration being such that the size of the dot-shaped recesses in the outer portion increases gradually toward the to-be-bent portion and such that the dot-shaped recesses of the largest size are distributed in the to-be-bent portion. In such a case, the method makes the part of the metal layer which hinders bending small in area in the to-be-bent portion, and causes a break to occur in few parts of the metal layer in the to-be-bent portion. Thus, the opto-electric hybrid board excellent in bendability and also excellent in resistance to repeated bending as mentioned above is easily provided.

Preferably, part of the opto-electric hybrid board is formed as a to-be-bent portion, and parts of the metal layer corresponding to the to-be-bent portion and an outer portion outside the to-be-bent portion are formed in one of first and second configurations by the etching, the first configuration being such that the size of the dot-shaped protrusions in the outer portion decreases gradually toward the to-be-bent portion and such that the metal layer is removed in the to-be-bent portion, the second configuration being such that the size of the dot-shaped recesses in the outer portion increases gradually toward the to-be-bent portion and such that the metal layer is removed in the to-be-bent portion. In such a case, the method eliminates the part of the metal layer which hinders bending in the to-be-bent portion, and causes a break to occur in no parts of the metal layer in the to-be-bent portion. Thus, the opto-electric hybrid board more excellent in bendability and also more excellent in resistance to repeated bending as mentioned above is easily provided.

DETAILED DESCRIPTION OF THE INVENTION

Preferred embodiments according to the present invention will now be described in detail with reference to the drawings.

Figure 1A:
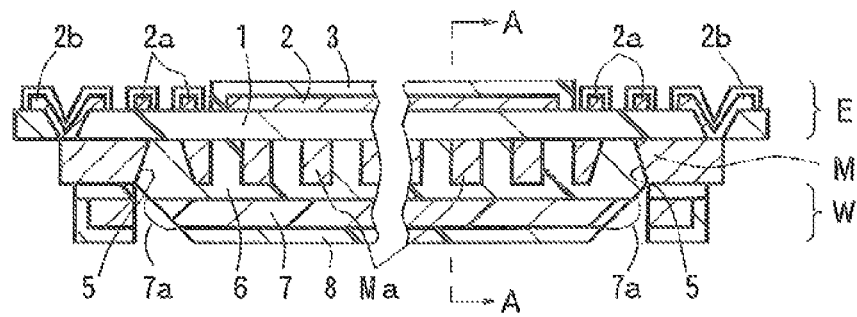
FIG. 1A is a longitudinal sectional view schematically showing an opto-electric hybrid board according to a first preferred embodiment.
Figure 1B:
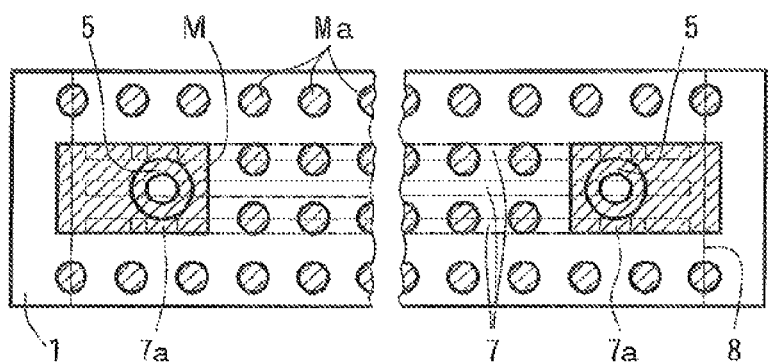
FIG. 1B is a bottom view schematically showing a distribution of dot-shaped protrusions shown in FIG. 1A.
Figure 1C:
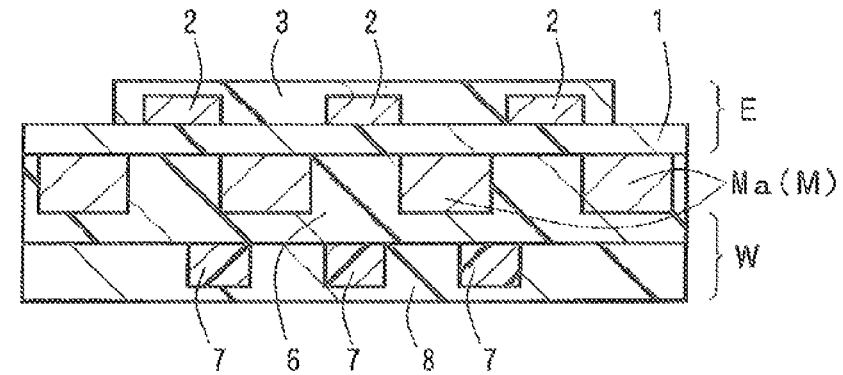
FIG. 1C is an enlarged view of a section taken along the line A-A of FIG. 1A.

FIG. 1A is a longitudinal sectional view schematically showing an opto-electric hybrid board according to a first preferred embodiment. FIG. 1B is a bottom view schematically showing a distribution of dot-shaped protrusions Ma formed by patterning a metal layer M in the opto-electric hybrid board. FIG. 1C is an enlarged view of a cross section (a section taken along the line A-A of FIG. 1A) of the opto-electric hybrid board. In FIG. 1B, the dot-shaped protrusions Ma are shown as shaded for the sake of definiteness of metal portions such as the dot-shaped protrusions Ma, and cores 7 and the like in an optical waveguide W are indicated by dash-double-dot lines, rather than solid lines, for the sake of easier understanding of the distribution of the dot-shaped protrusions Ma. As shown in FIG. 1A, the opto-electric hybrid board according to the first preferred embodiment is a strip-shaped opto-electric hybrid board which includes: an electric circuit board E including an insulative layer 1 having front and back surfaces, and electrical interconnect lines 2 formed on the front surface of the insulative layer 1; the optical waveguide W including a first cladding layer (under cladding layer) 6 formed on the back surface of the insulative layer 1 of the electric circuit board E; and the metal layer M formed between the first cladding layer (under cladding layer) 6 of the optical waveguide W and the insulative layer 1 of the electric circuit board E. As shown in FIG. 1B, the metal layer M includes the dot-shaped protrusions Ma of uniform size which are distributed in the form of a square lattice to produce a regular pattern. As shown in FIGS. 1A and 1C, the first cladding layer (under cladding layer) 6 in the optical waveguide W fills a space lying between adjacent ones of the dot-shaped protrusions Ma.

In the opto-electric hybrid board, the metal layer M is not entirely formed, but the dot-shaped protrusions Ma are disposed dispersedly instead. Thus, the opto-electric hybrid board is rich in flexibility. The dot-shaped protrusions Ma disposed dispersedly serve as a reinforcement to prevent stresses and slight bending in the cores 7 of the optical waveguide W. As a result, the increase in light propagation losses in the optical waveguide W is suppressed.

The shape of the dot-shaped protrusions Ma as seen in plan view is circular in FIG. 1B, but may be other shapes including polygons such as a triangle and a rectangle, for example. The size of the dot-shaped protrusions Ma as seen in plan view is in the range of 0.010 to 1.0 mm in diameter, for example (for a polygon as seen in plan view, a size substantially inscribed in a circle having such a diameter). The density of the dot-shaped protrusions Ma is set as appropriate depending on required flexibility and reinforcing properties. For example, as the density is increased, the flexibility is decreased and the reinforcing properties are increased. On the other hand, as the density is decreased, the flexibility is increased and the reinforcing properties are decreased.

More specifically, the electric circuit board E includes the insulative layer 1, and the electrical interconnect lines 2 formed on the front surface of the insulative layer 1, as stated above. In opposite longitudinal end portions of the opto-electric hybrid board, uncovered optical element mounting pads 2a are formed on the front surface of the insulative layer 1, and uncovered grounding electrodes 2b extend through the insulative layer 1 into contact with the metal layer M on the back surface of the insulative layer 1. The optical element mounting pads 2a and the grounding electrodes 2b are portions of the electrical interconnect lines 2. Portions of the electrical interconnect lines 2 other than the optical element mounting pads 2a and the grounding electrodes 2b are covered with a coverlay 3, and are insulated and protected. The insulative layer 1 is transparent.

The metal layer M includes the dot-shaped protrusions Ma which are distributed in the form of a square lattice to produce a regular pattern, as stated above. The opposite longitudinal end portions of the metal layer M have through holes 5 for an optical path which are in positions corresponding respectively to the optical element mounting pads 2a of the electric circuit board E (with reference to FIG. 1A). Portions of the metal layer M where the through holes 5 are formed are in contact with the grounding electrodes 2b.

The optical waveguide W includes the first cladding layer (under cladding layer) 6, the cures 7 formed in a predetermined pattern on the front surface (the lower surface as seen in FIGS. 1A and 1C) of the first cladding layer 6, and a second cladding layer (over cladding layer) 8 formed on the front surface of the first cladding layer 6 so as to cover the cores 7. The first cladding layer 6 has a back surface (a surface opposite from the surface with the cores 7 formed thereon) in contact with the dot-shaped protrusions Ma (the metal layer M), and fills the space lying between adjacent ones of the dot-shaped protrusions Ma and the through holes 5 for an optical path. In the opposite longitudinal end portions of the optical waveguide W, portions of the cores 7 corresponding to the optical element mounting pads 2a of the electric circuit board E are in the form of inclined surfaces at 45 degrees with respect to the longitudinal direction of the cores 7. The inclined surfaces serve as reflecting surfaces 7a capable of reflecting light beams to propagate light beams between an optical element mounted on the optical element mounting pads 2a and the cores 7. At the reflecting surfaces 7a, the refractive index of the cores 7 is higher than that of air present outside the reflecting surfaces 7a. For this reason, when light beams coming from a light-emitting element an optical element) and propagated through the cores 7 impinge upon the reflecting surfaces 7a, a majority of the light beams are reflected from the reflecting surfaces 7a to change the optical path thereof by 90 degrees.

Next, a method of manufacturing the opto-electric hybrid board will be described (with reference to FIGS. 2A to 2D, 3, and 4A to 4C).

First, the metal layer M of a flat configuration (with reference to FIG. 1A) is prepared. Examples of a material for the formation of the metal layer M include stainless steel, copper, silver, aluminum, nickel, chromium, titanium, platinum and gold. In particular, stainless steel is preferable from the viewpoint of bending resistance and the like. The metal layer M has a thickness in the range of 10 to 70 μm, for example.

Figure 2A:
FIGS. 2A to 2D are illustrations schematically showing the steps of producing an electrical circuit board in a method of manufacturing the opto-electric hybrid board.

Next, as shown in FIG. 2A, a photosensitive insulating resin including a polyimide resin and the like is applied to the front surface of the metal layer M to form the insulative layer 1 having a predetermined pattern by a photolithographic process. In the first preferred embodiment, holes 1a which uncover the front surface of the metal layer M are formed in the opposite longitudinal end portions, respectively, of the insulative layer 1 for the purpose of forming the grounding electrodes 2b for contact with the metal layer M. The insulative layer 1 has a thickness in the range of 3 to 50 μm.

Figure 2B:

Next, as shown in FIG. 2B, the electrical interconnect lines 2 (including the optical element mounting pads 2a and the grounding electrodes 2b) are formed by a semi-additive process, for example. The semi-additive process is as follows. First, a metal film (not shown) made of copper, chromium and the like is formed on the front surface of the insulative layer 1 by sputtering, electroless plating or the like. This metal film serves as a seed layer (a layer serving as a basis material for the formation of an electroplated layer) for a subsequent electroplating process. Then, a photosensitive resist (not shown) is laminated to the opposite surfaces of a laminate comprised of the metal layer M, the insulative layer 1, and the seed layer. Thereafter, a photolithographic process is performed to form holes having the pattern of the electrical interconnect lines 2 (including the optical element mounting pads 2a and the grounding electrodes 2b) in the photosensitive resist on the side where the seed layer is formed, so that surface portions of the seed layer are uncovered at the bottoms of the holes. Next, electroplating is performed to form an electroplated layer made of copper and the like in a stacked manner on the surface portions of the seed layer uncovered at the bottoms of the holes. Then, the photosensitive resist is stripped away using an aqueous sodium hydroxide solution and the like. Thereafter, a portion of the seed layer on which the electroplated layer is not formed is removed by soft etching. Laminate portions comprised of the remaining seed layer and the electroplated layer are the electrical interconnect lines 2 (including the optical element mounting pads 2a and the grounding electrodes 2b).

Figure 2C:

Then, an electroless plated layer made of nickel and the like (not shown) is formed on the front surface of the electrical interconnect lines 2 (including the optical element mounting pads 2a and the grounding electrodes 2b). Thereafter, as shown in FIG. 2C, photosensitive insulating resin including a polyimide resin and the like is applied to a portion of the electrical interconnect lines 2 other than the optical element mounting pads 2a and the grounding electrodes 2b to form the coverlay 3 by a photo lithographic process.

Figure 2D:
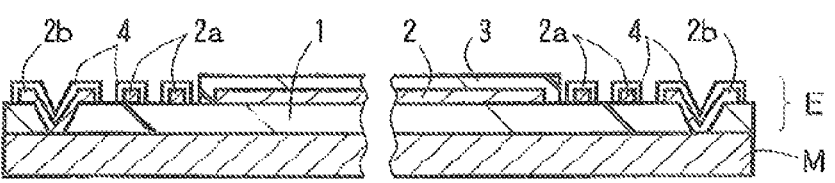

Then, the electroless plated layer (not shown) formed on the optical element mounting pads 2a and the grounding electrodes 2b is removed by etching. Thereafter, electroplated layers 4 made of gold, nickel and the like are formed in sites where the electroless plated layer is removed, as shown in FIG. 2D. In this manner, the electric circuit board E is formed on the front surface of the metal layer M.

Next, a photosensitive resist (not shown) is laminated to the opposite surfaces of a laminate comprised of the metal layer M and the electric circuit board E. Thereafter, holes are formed by a photolithographic process in portions of the photosensitive resist on the back surface (the surface opposite from the electric circuit board E) of the metal layer M which correspond to the space lying between adjacent ones of the dot-shaped protrusions Ma (with reference to FIG. 1B) and correspond to the through holes 5 for an optical path (with reference to FIG. 1A), so that back surface portions of the metal layer M are uncovered at the bottoms (the top surfaces as seen in the figure) of the holes.

Figure 3:
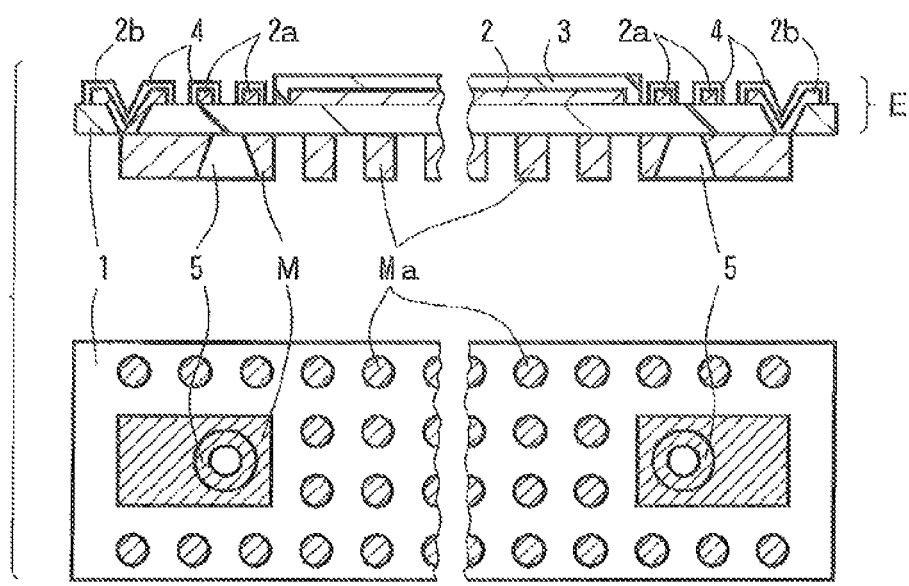
FIG. 3 is an illustration schematically showing the step of etching a metal layer in the method of manufacturing the opto-electric hybrid board.

Then, as shown in FIG. 3 (in which an upper portion is a longitudinal sectional view, and a lower portion is a bottom view), the portions of the metal layer M uncovered at the bottoms of the holes are removed by etching using an aqueous etching solution for the metal material of the metal layer M (for example, an aqueous ferric chloride solution for a stainless steel layer), so that the insulative layer 1 is uncovered at the bottoms (the top surfaces as seen in the longitudinal sectional view) of sites where the metal layer M is removed. Thereafter, the photosensitive resist is stripped away using an aqueous sodium hydroxide solution and the like.

Figure 4A:
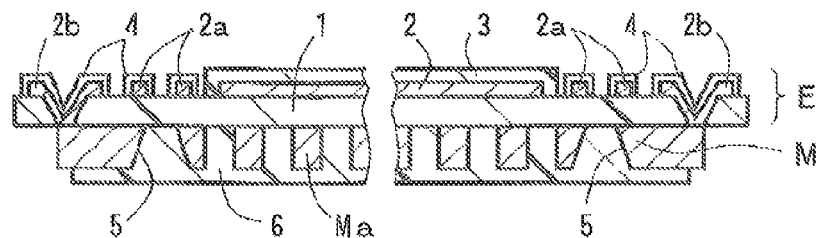
FIGS. 4A to 4C are illustrations schematically showing the steps of producing an optical waveguide in the method of manufacturing the opto-electric hybrid board.

For the formation of the optical waveguide W (with reference to FIG. 1A) on the back surface of the metal layer M, a photosensitive resin which is a material for the formation of the first cladding layer (under cladding layer) 6 is applied to the back surface (the lower surface as seen in the figure) of the metal layer M, as shown in FIG. 4A. Thereafter, the applied layer is exposed to irradiation light. This exposure cures the applied layer to form the first cladding layer 6. The first cladding layer 6 fills the sites where the metal layer M is removed by etching (the space lying between adjacent ones of the dot-shaped protrusions Ma and the through holes 5 for an optical path). The first cladding layer 6 in the first preferred embodiment has a thickness (as measured from the back surface of the insulative layer 1) greater than that of the metal layer M. It should be noted that the back surface of the metal layer M is positioned to face upward when the optical waveguide W is formed (when the aforementioned first cladding layer 6, the cores 7 to be described later and the second cladding layer 8 to be described later are formed).

Figure 4B:
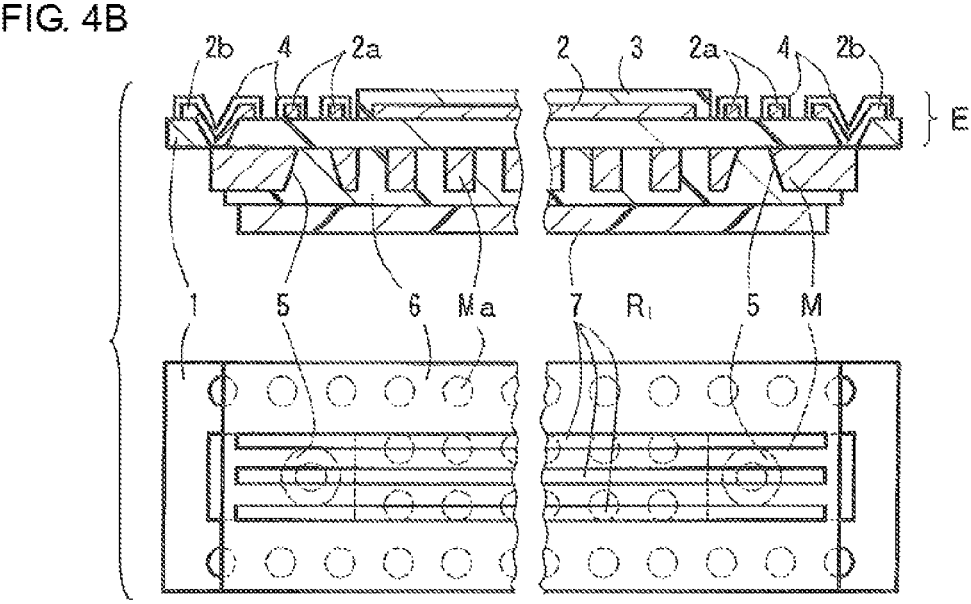

Then, as shown in FIG. 4B (in which an upper portion is a longitudinal sectional view, and a lower portion is a bottom view), the cores 7 having a predetermined pattern are formed on the front surface (the lower surface as seen in the longitudinal sectional view) of the first cladding layer 6 by a photolithographic process. The cores 7 have a thickness in the range of 20 to 100 μm, and a width in the range of 10 to 100 μm. An example of a material for the formation of the cores 7 includes a photosensitive resin similar to that for the first cladding layer 6, and the material used herein has a refractive index higher than that of the material for the formation of the aforementioned first cladding layer 6 and the second cladding layer 8 to be described below (with reference to FIG. 4C). The adjustment of the refractive index may be made, for example, by adjusting the selection of the types of the materials for the formation of the first cladding layer 6, the cores 7 and the second cladding layer 8, and the composition ratio thereof.

Figure 4C:
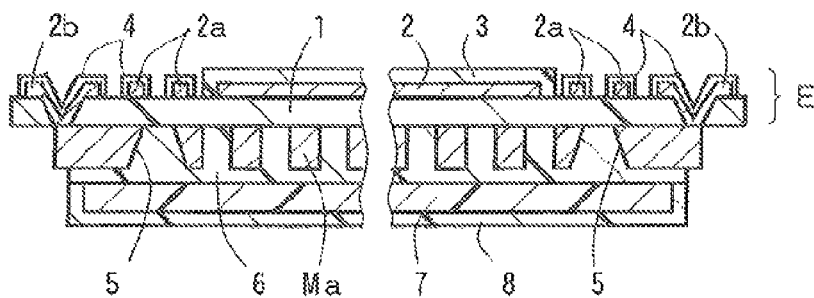

Next, as shown in FIG. 4C, the second cladding layer 8 is formed on the front surface (the lower surface as seen in the figure) of the first cladding layer 6 by a photolithographic process so as to cover the cores 7. The second cladding layer 8 has a thickness (as measured from the front surface of the first cladding layer 6) not less than that of the cores 7 and not greater than 300 μm. An example of a material for the formation of the second cladding layer 8 includes a photosensitive resin similar to that for the first cladding layer 6.

Then, portions (opposite end portions) of the optical waveguide W (positioned in a lower part in the figure) corresponding to the optical element mounting pads 2a of the electric circuit board E are formed into inclined surfaces inclined at 45 degrees with respect to the longitudinal direction of the cores 7 by laser beam machining, cutting using a rotary blade and the like having an included angle of 45 degrees, and the like (with reference to FIG. 1A). Portions of the cores 7 positioned at the inclined surfaces function as the light reflecting surfaces 7a. In this manner, the optical waveguide W is formed on the back surface of the metal layer M. This provides the opto-electric hybrid board shown in FIGS. 1A to 1C.

Figure 5:
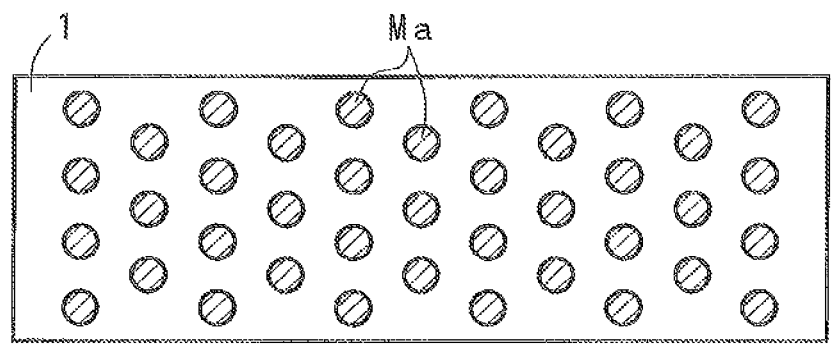
FIG. 5 is a bottom view schematically showing a modification of the distribution of the dot-shaped protrusions.

The dot-shaped protrusions Ma have a pattern in the form of a square lattice in the first preferred embodiment, but may have patterns in other forms, e.g. in the form of a triangular lattice as shown in FIG. 5. Further, the pattern of the dot-shaped protrusions Ma may be a random pattern (not shown). Alternatively, the dot-shaped protrusions Ma of various sizes may be distributed in a random fashion (not shown).

Figure 6:
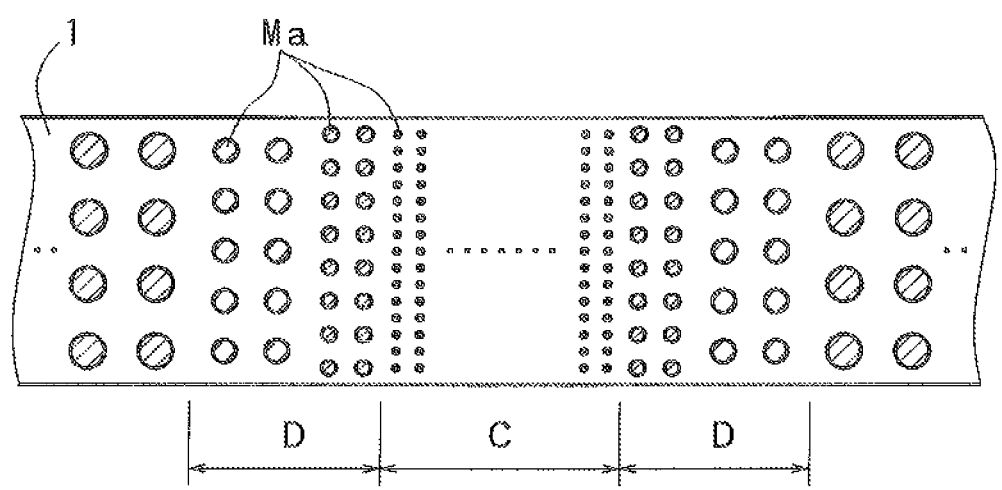
FIG. 6 is a bottom view schematically showing a distribution of dot-shaped protrusions in an opto-electric hybrid board according to a second preferred embodiment.

FIG. 6 is a bottom view schematically showing a distribution of dot-shaped protrusions Ma in an opto-electric hybrid board according to a second preferred embodiment. The opto-electric hybrid board according to the second preferred embodiment is configured such that the longitudinal middle portion of the opto-electric hybrid board of the first preferred embodiment (with reference to FIGS. 1A to 1C) is a to-be-bent portion C so that the longitudinal end portions (the left-hand and right-hand end portions as seen in the figure) are raised (raised in a direction perpendicular to the plane of the figure) with respect to the longitudinal middle portion. In outer portions D outside the to-be-bent portion C, the size of the dot-shaped protrusions Ma decreases gradually toward the to-be-bent portion C. In the to-be-bent portion C, the dot-shaped protrusions Ma of the smallest size are distributed. Other parts of the second preferred embodiment are similar to those of the first preferred embodiment. Like reference numerals and characters are used to designate parts similar to those of the first preferred embodiment.

The opto-electric hybrid board according to the second preferred embodiment has functions and effects to be described below in addition to the functions and effects of the first preferred embodiment. The density of the dot-shaped protrusions Ma decreases gradually toward the to-be-bent portion C, and is lowest in the to-be-bent portion C. Thus, the to-be-bent portion C, in which the dot-shaped protrusions Ma that hinder bending are small in area, is excellent in bendability. If the to-be-bent portion C is bent repeatedly, a break occurs in few dot-shaped protrusions Ma in the to-be-bent portion C. Accordingly, no breaks occur in the cores 7 (with reference to FIG. 1A) of the optical waveguide W. Thus, the opto-electric hybrid board is excellent in resistance to repeated bending. The sites where the metal layer M (with reference to FIG. 1A) is removed by patterning are not hollow but are filled with the first cladding layer (under cladding layer) 6 of the optical waveguide W. This stabilizes the shape of the cores 7 of the optical waveguide W to maintain proper light propagation if the opto-electric hybrid board is bent in the to-be-bent portion C. The optical waveguide W may be positioned either inside or outside when the opto-electric hybrid board is bent.

Figure 7:
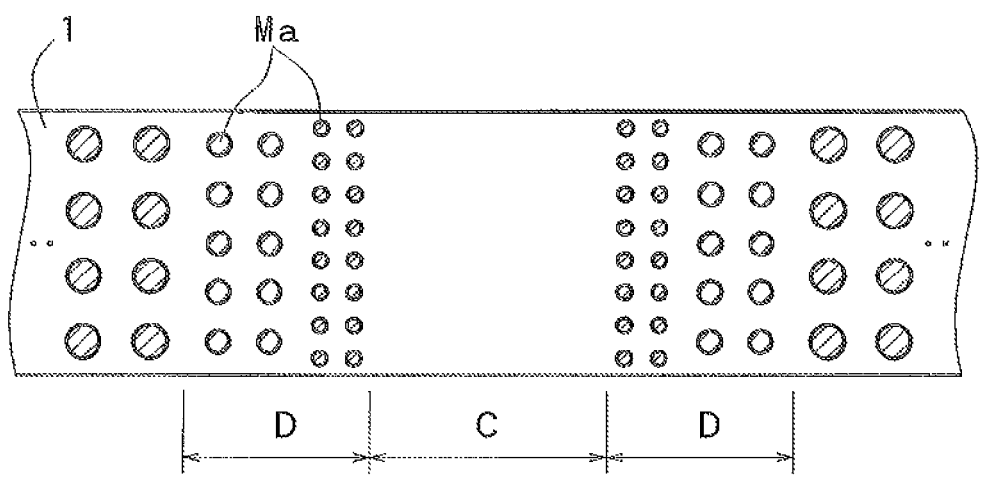
FIG. 7 is a bottom view schematically showing a distribution of dot-shaped protrusions in an opto-electric hybrid board according to a third preferred embodiment.

FIG. 7 is a bottom view schematically showing a distribution of dot-shaped protrusions Ma in an opto-electric hybrid board according to a third preferred embodiment. The opto-electric hybrid board according to the third preferred embodiment is configured such that some of the dot-shaped protrusions Ma (i.e., part of the metal layer M) corresponding to the to-be-bent portion C in the second preferred embodiment (with reference to FIG. 6) are removed. The site where some of the dot-shaped protrusions Ma corresponding to the to-be-bent portion C are removed is also filled with the first cladding layer (under cladding layer) 6 of the optical waveguide W. Other parts of the third preferred embodiment are similar to those of the second preferred embodiment. Like reference numerals and characters are used to designate parts similar to those of the second preferred embodiment.

In the third preferred embodiment, the metal layer M (i.e., the dot-shaped protrusions Ma) is absent in the to-be-bent portion C. Thus, the to-be-bent portion C, in which there are no parts of the metal layer M which hinder bending, is more excellent in bendability. If the to-be-bent portion C is bent repeatedly, there are no parts of the metal layer M in which a break occurs. Accordingly, no breaks occur in the cores 7 of the optical waveguide W. Thus, the opto-electric hybrid board is more excellent in resistance to repeated bending.

A method of manufacturing the opto-electric hybrid board according to the third preferred embodiment will be described below. The manufacturing method of the third preferred embodiment until the step of forming the electric circuit board E on the front surface of the metal layer M is similar to that of the first preferred embodiment (with reference to FIGS. 2A to 2D). In the subsequent step of etching the metal layer M (with reference to FIG. 3), a portion of the metal layer M corresponding to the to-be-bent portion C (the longitudinal middle portion) is removed by etching, in addition to the portions thereof corresponding to the space lying between adjacent ones of the dot-shaped protrusions Ma and corresponding to the through holes 5 for an optical path. The step of forming the optical waveguide W and its subsequent steps are similar to those of the first preferred embodiment (with reference to FIGS. 4A to 4C).

Figure 8:
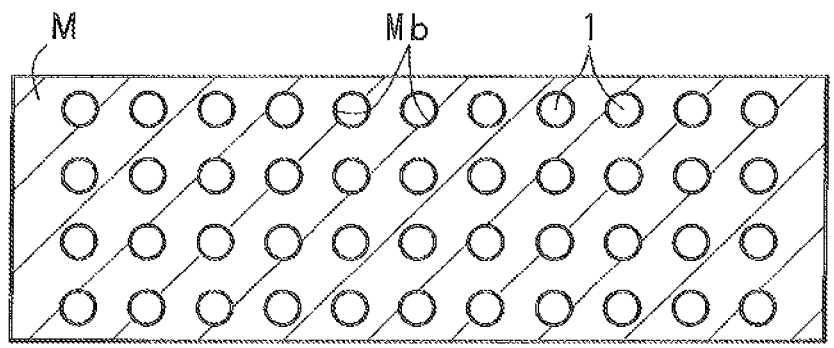
FIG. 8 is a bottom view schematically showing a distribution of dot-shaped recesses in an opto-electric hybrid board according to a fourth preferred embodiment.

FIG. 8 is a bottom view schematically showing a distribution of dot-shaped recesses Mb formed by patterning the metal layer M in an opto-electric hybrid board according to a fourth preferred embodiment. In FIG. 8, the metal layer M except the dot-shaped recesses Mb is shown as shaded for the sake of definiteness of the dot-shaped recesses Mb. In the fourth preferred embodiment, the metal layer M includes the dot-shaped recesses Mb of uniform size which are distributed in the form of a square lattice to produce a regular pattern. The first cladding layer (under cladding layer) 6 in the optical waveguide W fills the dot-shaped recesses Mb. Other parts of the fourth preferred embodiment are similar to those of the first preferred embodiment (with reference to FIGS. 1A to 1C). Like reference numerals and characters are used to designate parts similar to those of the first preferred embodiment. The fourth preferred embodiment has functions and effects similar to those of the first preferred embodiment described above.

The shape of the dot-shaped recesses Mb as seen in plan view is circular in FIG. 8, but may be other shapes including polygons such as a triangle and a rectangle, for example. The size of the dot-shaped recesses Mb as seen in plan view is in the range of 0.010 to 1.0 mm in diameter, for example (for a polygon as seen in plan view, a size substantially inscribed in a circle having such a diameter). The density of the dot-shaped recesses Mb is set as appropriate depending on required flexibility and reinforcing properties. For example, as the density is increased, the flexibility is increased and the reinforcing properties are decreased. On the other hand, as the density is decreased, the flexibility is decreased and the reinforcing properties are increased.

The dot-shaped recesses Mb have a pattern in the form of a square lattice in the fourth preferred embodiment, but may have patterns in other forms, e.g. in the form of a triangular lattice (with reference to FIG. 5). Further, the pattern of the dot-shaped recesses Mb may be a random pattern (not shown). Alternatively, the dot-shaped recesses Mb of various sizes may be distributed in a random fashion not shown).

Figure 9:
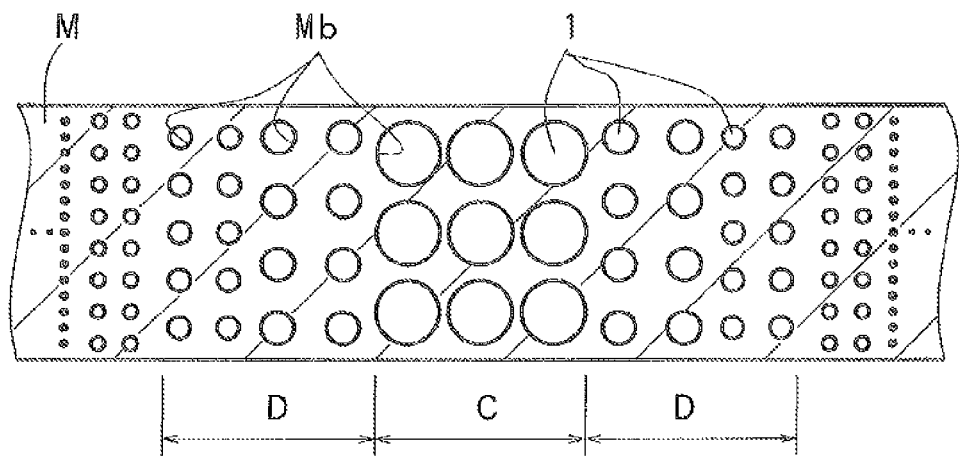
FIG. 9 is a bottom view schematically showing a distribution of dot-shaped recesses in an opto-electric hybrid board according to a fifth preferred embodiment.

FIG. 9 is a bottom view schematically showing a distribution of dot-shaped recesses Mb in an opto-electric hybrid board according to a fifth preferred embodiment. The fifth preferred embodiment is similar to the second preferred embodiment with reference to FIG. 6) in that the longitudinal middle portion of the opto-electric hybrid board is the to-be-bent portion C. In the outer portions D outside the to-be-bent portion C, the size of the dot-shaped recesses Mb increases gradually toward the to-be-bent portion C. In the to-be-bent portion C, the dot-shaped recesses Mb of the largest size are distributed. Other parts of the fifth preferred embodiment are similar to those of the fourth preferred embodiment (with reference to FIG. 8). Like reference numerals and characters are used to designate parts similar to those of the fourth preferred embodiment.

The opto-electric hybrid board according to the fifth preferred embodiment has functions and effects to be described below in addition to the functions and effects of the fourth preferred embodiment. The density of the dot-shaped recesses Mb increases gradually toward the to-be-bent portion C, and is highest in the to-be-bent portion C. Thus, the to-be-bent portion C, in which part of the metal layer M other than the dot-shaped recesses Mb which hinders bending is small in area, is excellent in bendability. If the to-be-bent portion C is bent repeatedly, a break occurs in few parts of the metal layer M in the to-be-bent portion C. Accordingly, no breaks occur in the cores 7 of the optical waveguide W. Thus, the opto-electric hybrid board is excellent in resistance to repeated bending. The sites where the metal layer M (with reference to FIG. 1A) is removed by patterning are not hollow but are filled with the first cladding layer (under cladding layer) 6 of the optical waveguide W. This stabilizes the shape of the cores 7 of the optical waveguide W to maintain proper light propagation if the opto-electric hybrid board is bent in the to-be-bent portion C. The optical waveguide W may be positioned either inside or outside when the opto-electric hybrid board is bent.

Figure 10:
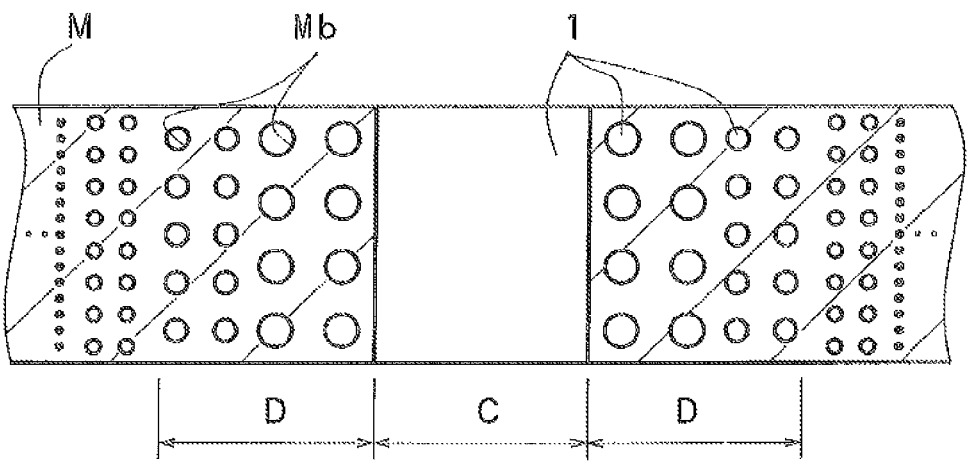
FIG. 10 is a bottom view schematically showing a distribution of dot-shaped recesses in an opto-electric hybrid board according to a sixth preferred embodiment.

FIG. 10 is a bottom view schematically showing a distribution of dot-shaped recesses Mb in an opto-electric hybrid board according to a sixth preferred embodiment. The opto-electric hybrid board according to the sixth preferred embodiment is configured such that part of the metal layer M corresponding to the to-be-bent portion C in the fifth preferred embodiment (with reference to FIG. 9) is removed. The site where part of the metal layer M corresponding to the to-be-bent portion C is removed is also filled with the first cladding layer (under cladding layer) 6 of the optical waveguide W. Other parts of the sixth preferred embodiment are similar to those of the fifth preferred embodiment. Like reference numerals and characters are used to designate parts similar to those of the fifth preferred embodiment. The sixth preferred embodiment has functions and effects similar to those of the third preferred embodiment described above (with reference to FIG. 7).

Next, inventive examples of the present invention will be described in conjunction with comparative examples. It should be noted that the present invention is not limited to the inventive examples.

EXAMPLES

Inventive Examples 1 to 3

The opto-electric hybrid board in the first preferred embodiment was prepared as an opto-electric hybrid board in inventive Example 1. The opto-electric hybrid board in the second preferred embodiment was prepared as an opto-electric hybrid board in Inventive Example 2. The opto-electric hybrid board in the third preferred embodiment was prepared as an opto-electric hybrid board in Inventive Example 3. Each of the opto-electric hybrid boards in Inventive Examples 1 to 3 included a stainless steel layer (metal layer) having a thickness of 10 μm, an insulative layer having a thickness of 5 μm, a first cladding layer having a thickness (as measured from the back surface of the insulative layer) of 10 μm, cores having a thickness of 50 μm and to width of 80 μm, and a second cladding layer having a thickness (as measured from the front surface of the first cladding layer) of 70 μm.

In Inventive Example 1, dot-shaped protrusions had a diameter of 0.500 mm, and were arranged at a spacing of 0.100 mm. In inventive Example 2, the diameter and spacing of the dot-shaped protrusions in opposite longitudinal end portions of the opto-electric hybrid board were similar to those in inventive Example 1, and the dot-shaped protrusions in a to-be-bent portion had a diameter of 0.050 mm, and were arranged at a spacing of 0.500 mm. In outer portions outside the to-be-bent portion in Inventive Example 2, the size of the dot-shaped protrusions decreased gradually toward the to-be-bent portion. In Inventive Example 3, no dot-shaped protrusions were formed in the to-be-bent portion, and the diameters and spacings of the dot-shaped protrusions in the opposite longitudinal end portions and in the outer portions outside the to-be-bent portion were similar to those in Inventive Example 2.

Comparative Examples 1 and 2

Figure 11:
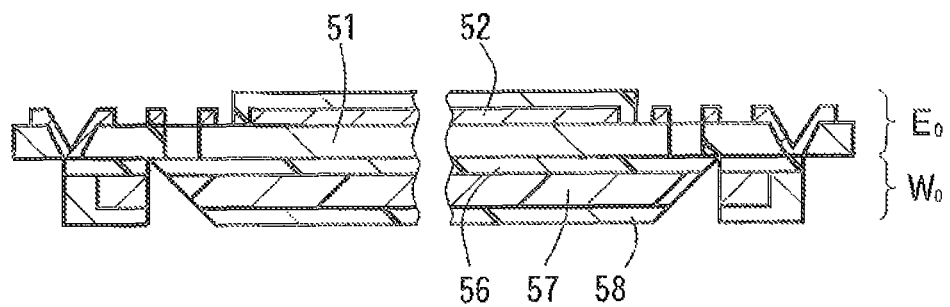
FIG. 11 is a longitudinal sectional view schematically showing a conventional opto-electric hybrid board.
Figure 12:
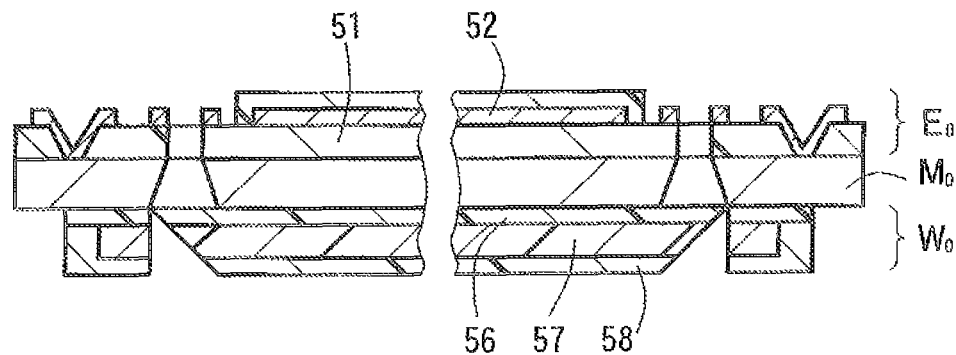
FIG. 12 is a longitudinal sectional view schematically showing another conventional opto-electric hybrid hoard.

The opto-electric hybrid board shown in FIG. 11 was prepared as an opto-electric hybrid board in Comparative Example 1, and the opto-electric hybrid board shown in FIG. 12 was prepared as an opto-electric hybrid board in Comparative Example 2. The components, including the stainless steel layer and the like, of the opto-electric hybrid boards in Comparative Examples 1 and 2 had dimensions equal to those in Inventive Examples 1 to 3.

<Measurement of Light Propagation Losses>

A light-emitting element (ULM850-10-TT-C0104U available from U-L-M photonics GmbH) and a light-receiving element (PDCA04-70-GS available from Albis Optoelectronics AG) were prepared. The amount of light $I_0$ was measured when light emitted from the light-emitting element was directly received by the light-receiving element. Then, the light-emitting element was mounted on optical element mounting pads in one end portion of each of the opto-electric hybrid boards in Inventive Examples 1 to 3 and Comparative Examples 1 and 2, and the light-receiving element was mounted on optical element mounting pads in the other end portion thereof. Next, the amount of light I was measured when light emitted from the light-emitting element was received by the light-receiving element via the cores of the optical waveguide. Based on the values of the amounts of light $I_0$ and I, $[-10 \times \log(I/I_0)]$ was calculated, and divided by the length of the cores. The results of the division were determined as light propagation losses. The results were listed in Table 1 below.

<Flexibility>

Each of the opto-electric hybrid boards in Inventive Examples 1 to 3 and Comparative Examples 1 and 2 was held in hands and bent by the hands, and the flexibility of each opto-electric hybrid board was evaluated. The results were listed in Table 1 below in which an opto-electric hybrid board which was relatively prone to deformation was evaluated as being excellent in flexibility and indicated by an open circle, and an opto-electric hybrid board which was relatively less prone to deformation was evaluated as being poor in flexibility and indicated by a cross.

TABLE 1

|  | Inv. Ex. 1 | Inv. Ex. 2 | Inv. Ex. 3 | Comp. Ex. 1 | Comp. Ex. 2 |
| --- | --- | --- | --- | --- | --- |
| Light Propagation Loss (dB/cm) | 0.10 | 0.11 | 0.12 | 0.27 | 0.09 |
| Flexibility | ○ | ○ | ○ | ○ | x |

The results in Table 1 show that the light propagation losses in Inventive Examples 1 to 3 make no significant difference from the light propagation loss in Comparative Example 2 including the stainless steel layer. However, the results in Table 1 show that Inventive Examples 1 to 3 are more excellent in flexibility than Comparative Example 2. The results in Table 1 also show that Comparative Example 1 has flexibility but is high in light propagation loss.

Although the dot-shaped protrusions were formed in Inventive Examples 1 to 3 described above, results showing similar tendencies were produced by inventive examples in which dot-shaped recesses were formed as in the fourth to sixth preferred embodiments.

The opto-electric hybrid board according to the present invention is usable in instances where flexibility is required and the like.

Although specific forms of embodiments of the instant invention have been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention.

What is claimed is:

1. An opto-electric hybrid board, comprising:
an electric circuit board including an insulative layer having front and back surfaces, and electrical interconnect lines formed on the front surface of the insulative layer;
an optical waveguide including a cladding layer, the optical waveguide being formed on the back surface of the insulative layer of the electric circuit board; and
a metal layer formed between the cladding layer of the optical waveguide and the insulative layer of the electric circuit board,
wherein at least part of the metal layer is formed in one of first and second patterns,
wherein the first pattern includes a distribution of dot-shaped protrusions,
wherein the second pattern includes a distribution of dot-shaped recesses, and
wherein the cladding layer of the optical waveguide fills a site where the metal layer is removed by patterning.

2. The opto-electric hybrid board according to claim 1,
wherein part of the opto-electric hybrid board is formed as a to-be-bent portion;
wherein parts if the metal layer corresponding to the to-be-bent portion and an outer portion outside the to-be-bent portion have one of first and second configurations,
wherein in the first configuration, the size of the dot-shaped protrusions in the outer portion decreases gradually toward the to-be-bent portion and the smallest one of the dot-shaped protrusions are distributed in the to-be-bent portion, and
wherein in the second configuration, the size of the dot-shaped recesses in the outer portion increases gradually toward the to-be-bent portion and the largest ones of the dot-shaped recesses are distributed in the to-be-bent portion.

3. The opto-electric hybrid board according to claim 1,
wherein part of the opto-electric hybrid board is formed as a to-be-bent portion;
wherein parts of the metal layer corresponding to the to-be-bent portion and an outer portion outside the to-be-bent portion have one of first and second configurations,
wherein in the first configuration, the size of the dot-shaped protrusions in the outer portion decreases gradually toward the to-be-bent portion and the metal layer is removed in the to-be-bent portion, and
wherein in the second configuration, the size of the dot-shaped recesses in the outer portion increases gradually toward the to-be-bent portion and the metal layer is removed in the to-be-bent portion.

4. A method of manufacturing an opto-electric hybrid board, comprising: forming an insulative layer on a first surface of a metal layer;
forming electrical interconnect lines on a surface of the insulative layer;
forming an optical waveguide on a second surface of the metal layer, wherein at least part of the metal layer is etched to form one of first and second patterns prior to forming of the optical waveguide, the first pattern including a distribution of dot-shaped protrusions, the second pattern including a distribution of dot-shaped recesses, and wherein a cladding layer of the optical waveguide fills a site where the metal layer is removed by etching.

5. The method according to claim 4,
wherein part of the opto-electric hybrid board is formed as a to-be-bent portion;
wherein parts if the metal layer corresponding to the to-be-bent portion and an outer portion outside the to-be-bent portion are formed in one of first and second configurations by the etching,
wherein the first configuration, the size of the dot-shaped protrusions in the outer portion decreases gradually toward the to-be-bent portion and the smallest one of the dot-shaped protrusions are distributed in the to-be-bent portion, and
wherein in the second configuration, the size of the dot-shaped recesses in the outer portion increases gradually toward the to-be-bent portion and the largest ones of the dot-shaped recesses are distributed in the to-be-bent portion.

6. The method according to claim 4,
wherein part of the opto-electric hybrid board is formed as a to-be-bent portion;
wherein parts of the metal layer corresponding to the to-be-bent portion and an outer portion outside the to-be-bent portion are formed in one of first and second configurations by the etching,
wherein in the first configuration, the size of the dot-shaped protrusions in the outer portion decreases gradually toward the to-be-bent portion and the metal layer is removed in the to-be-bent portion, and
wherein in the second configuration, the size of the dot-shaped recesses in the outer portion increases gradually toward the to-be-bent portion and the metal layer is removed in the to-be-bent portion.

* * * * *